US012683323B2

(12) United States Patent
Homuth

(10) Patent No.: US 12,683,323 B2
(45) Date of Patent: Jul. 14, 2026

(54) ELECTRIC COMPRESSOR WITH A HERMETIC TERMINAL

(71) Applicant: MOTOR COMPETENCE CENTER HOLDING FLENSBURG GMBH, Flensburg (DE)

(72) Inventor: Dirk Homuth, Plon (DE)

(73) Assignee: MOTOR COMPETENCE CENTER HOLDING FLENSBURG GMBH, Flensburg (DE)

( * ) Notice: Subject to any disclaimer, the term of this patent is extended or adjusted under 35 U.S.C. 154(b) by 479 days.

(21) Appl. No.: 18/009,210

(22) PCT Filed: Jun. 18, 2021

(86) PCT No.: PCT/EP2021/066671

§ 371 (c)(1),
(2) Date: Dec. 8, 2022

(87) PCT Pub. No.: WO2021/255265

PCT Pub. Date: Dec. 23, 2021

(65) Prior Publication Data

US 2023/0238734 A1 Jul. 27, 2023

(30) Foreign Application Priority Data

Jun. 18, 2020 (EP) .................................... 20180802

(51) Int. Cl.
*F04B 35/04* (2006.01)
*F04B 39/12* (2006.01)
(Continued)

(52) U.S. Cl.
CPC ......... *H01R 13/5219* (2013.01); *F04B 35/04* (2013.01); *F04B 39/121* (2013.01);
(Continued)

(58) Field of Classification Search
CPC .............. H01R 13/5219; H01R 13/521; H01R 13/533; F04B 35/04; F04B 39/121; F04C 23/008; F04C 29/00; F04C 2240/803
See application file for complete search history.

(56) References Cited

U.S. PATENT DOCUMENTS 4,748,531 A 5/1988 Ortiz
4,840,547 A 6/1989 Fry
(Continued)

FOREIGN PATENT DOCUMENTS

CN 101324236 A 12/2008
CN 204441544 U * 7/2015
(Continued)

OTHER PUBLICATIONS

International Search Report from corresponding PCT Application No. PCT/EP2022/086099, Mar. 14, 2023.
(Continued)

*Primary Examiner* — Edwin A. Leon
(74) *Attorney, Agent, or Firm* — Workman Nydegger

(57) ABSTRACT

An electric hermetic compressor comprising a hermetic terminal with terminal pins for electrical connection of a motor inside a hermetic housing. The hermetic terminal forms a cavity, and the compressor further comprises a non-conductive sealing element that defines an enclosed space in the cavity.

17 Claims, 4 Drawing Sheets

(51) Int. Cl.

*F04C 23/00* (2006.01)
*F04C 29/00* (2006.01)
*H01R 13/52* (2006.01)
*H01R 13/533* (2006.01)

(52) U.S. Cl.

CPC ............ *F04C 23/008* (2013.01); *F04C 29/00* (2013.01); *H01R 13/521* (2013.01); *F04C 2240/803* (2013.01); *H01R 13/533* (2013.01)

(56) References Cited

U.S. PATENT DOCUMENTS

| | | | | |
|---|---|---|---|---|
| 4,966,559 | A | 10/1990 | Wisner | |
| 5,580,282 | A | 12/1996 | Paterek | |
| 6,375,497 | B1 | 4/2002 | Diflora | |
| 6,910,904 | B2 | 6/2005 | Herrick et al. | |
| 7,255,585 | B2 | 8/2007 | Kameyama et al. | |
| 8,210,835 | B2 | 7/2012 | Asaka | |
| 8,840,381 | B2 | 9/2014 | Fukasaku et al. | |
| 10,033,127 | B2 | 7/2018 | Bellet et al. | |
| 2003/0119373 | A1* | 6/2003 | Quadir | H01R 13/53 439/693 |
| 2004/0253124 | A1 | 12/2004 | Ioi et al. | |
| 2009/0060749 | A1 | 3/2009 | Hoying et al. | |
| 2011/0076162 | A1 | 3/2011 | Heidecker et al. | |
| 2011/0158833 | A1 | 6/2011 | Murakami et al. | |
| 2012/0302100 | A1 | 11/2012 | Picker et al. | |

FOREIGN PATENT DOCUMENTS

| | | | |
|---|---|---|---|
| CN | 110663140 | A | 1/2020 |
| EP | 3430262 | A1 | 1/2019 |

OTHER PUBLICATIONS

International Preliminary Report on Patentability from corresponding PCT Application No. PCT/EP2022/086099, Feb. 2, 2024.

International Search Report from PCT Application No. PCT/EP2021/066671, Oct. 8, 2021.

Search Report from European U.S. Appl. No. 21/214,715, filed Mar. 11, 2022.

International Preliminary Report on Patentability from PCT Application No. PCT/EP2021/066671, Jul. 13, 2022.

Chinese Search Report from Corresponding Chinese Patent Application No. CN202180041146.9, Jun. 29, 2025.

* cited by examiner

ELECTRIC COMPRESSOR WITH A HERMETIC TERMINAL

INTRODUCTION

The present invention relates to a hermetic electric compressor with an electric motor. The compressor comprises a hermetic terminal as part of the housing, and comprises at least two terminal pins to electrically connect at least one winding of the electric motor to an external power source. The power source is typically a grid connection, but could also be a battery connection or a connection to other sources of energy.

The hermetic terminal of such compressors typically comprises a terminal holder forming part of the housing, typically welded into the wall of the housing. The hermetic terminal may comprise at least two terminal pins made of an electrically conductive material. These terminal pins extend through the terminal holder. An insulative element is arranged to insulate the terminal pin from the terminal holder.

BACKGROUND

Hermetic electric compressors comprise an electric motor accommodated in a sealed housing. Such compressors are used, e.g., for household refrigeration, light commercial refrigeration, and heating purposes. The sealed housing contains a refrigerant, which is circulated between a condenser and an evaporator. By phase shifts between liquid and vapour phases, thermal exchange can provide efficient heating and cooling. Examples of refrigerants include R134a, R407C, R744 ($CO_2$), and R290.

The hermetic terminal includes terminal pins, which are formed from a conductive material, e.g., different kinds of alloys such as steel, and a terminal holder, which holds the terminal pins. The terminal holder is typically made of alloys such as steel. An insulative element, i.e., a material, such as a ceramic, glass, or epoxy, is arranged between the terminal pin and the terminal holder, and the terminal holder is typically welded into an opening in the sealed housing of the compressor, thereby preserving the sealed structure of the compressor.

Often, the electric motor comprises a main winding and an auxiliary winding, and to power the windings, the hermetic terminal comprises three terminal pins, one for connecting a common potential, i.e., the zero or phase, and the two other terminal pins for connecting to each of the main winding and auxiliary winding. The electric motor could also be a DC motor, or a permanent magnet AC or DC motor, etc.

SUMMARY OF THE INVENTION

Embodiments of the disclosure provide an electric compressor further comprising a non-conductive sealing element defining an enclosed space in the cavity.

During operation, liquids constituted by lubricant and refrigerant in the housing contaminate the insulative sealing element. The liquids typically contain metallic particles arising from wear of moving metal parts in the compression assembly and the electric motor. When the insulative sealing elements are contaminated with such contaminated liquids, a leak current may develop between the terminal pin and the terminal holder, i.e., across the insulative sealing elements.

The sealing element may particularly form a closure for the cavity and thereby protect the insulative sealing elements against contamination by forming an enclosed space in the cavity.

The terminal holder may define an edge extending about the cavity, and the sealing element may be configured to seal against the edge to thereby define the enclosed space in the cavity.

The sealing element may comprise a plug structure configured to electrically engage the terminal pins and connect them to the electric motor.

The plug structure may be configured to maintain the sealing element against the edge by the engagement between the terminal pins and the plug structure.

The electric compressor may define an operational orientation. This orientation may particularly be required to collect liquids in the bottom part, etc. The plug structure may define a cable direction in which cables extend away from the hermetic terminal, the cable direction being downwards relative to gravity when the electric compressor is in the operational orientation.

The sealing element may form a base and an annular wall extending from the base and configured to enter into the cavity. The annular wall may particularly be in sealing contact with an inner surface of the cavity and thereby increase the sealed conditions of the cavity, and it may increase the fixation of the sealing element onto the terminal holder. The annular wall and the base may be formed in one piece, e.g., in a resilient or elastically deformable material, e.g., a rubber material.

The sealing element may comprise at least one annular ridge extending from the base, e.g., extending about the annular wall outside the cavity. The annular ridge may form an efficient way of preventing liquids on the base from reaching the annular wall. The ridge or ridges may particularly extend in one or more rings about the annular wall, and they may have a triangular shape in a cross-section transverse to the ring shape.

In one embodiment, at least one of: the cavity formed by the terminal holder, the annular wall, and the annular ridges, may be circular. Particularly, the cavity and the annular wall may have matching circular shape and size such that the annular wall can be received snugly in the cavity and maintained therein by friction between an outer surface of the annular wall and an inner wall of the cavity formed by the terminal holder.

At least one annular ridge may extend in parallel with the annular wall. This embodiment could be achieved by a circular annular wall coaxially aligned with one or more circular ridges.

At least one of the annular wall or annular ridge may comprise at least one indentation defining an opening across the annular wall or annular ridge. The indentation may form a score from an upper edge of the wall or ridge and all the way to the base. The indentation may allow liquids trapped in the cavity or trapped between the annular wall and one of the ridges to be drained via the indentation.

The electric compressor may, as mentioned previously, define an operational orientation, e.g., based on the location where liquids are collected for an oil pump inlet, etc. At least one indentation may be located in a downwards portion of the annular ridge or annular wall relative to gravity when the electric compressor is in the operational orientation.

In one embodiment, the sealing element comprises at least two indentations defining an opening across one of the annular wall or annular ridge.

At least two indentations may be symmetrically placed with respect to a vertical plane when the electric compressor is in the operational orientation.

The base may form a plane surface which is transverse to or perpendicular to the terminal pins. The plane surface may particularly be an inner surface facing inwards towards the cavity, which is closed by the sealing element.

The electric motor may particularly have a main winding and an auxiliary winding used during the start of the motor. For this purpose, the electric compressor may particularly comprise three terminal pins extending through the terminal holder and connected to the electric motor such that one pin connects to a corresponding winding and the third pin forms zero for both windings.

In a second aspect, the disclosure provides a method of sealing a cavity of a hermetic terminal for an electric compressor, the method comprising providing a sealing element configured to define an enclosed space in the cavity, the sealing element being provided with an integrated plug structure, and the plug structure is utilized for keeping the sealing element against an edge of the terminal holder to thereby define the enclosed space in the cavity.

LIST OF DRAWINGS

The disclosure will now be described in further detail with reference to the accompanying drawings in which.

DETAILED DESCRIPTION OF THE DRAWINGS

Figure 1:
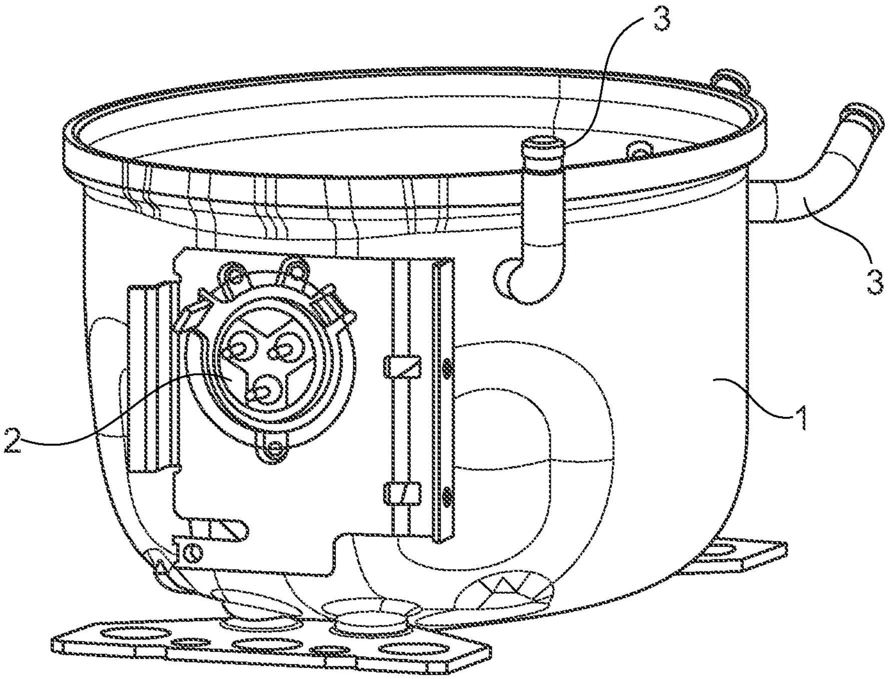
FIG. 1 illustrates a perspective view of a lower half part of a compressor housing with a hermetic terminal.

The following description refers to an embodiment of the disclosure. FIG. 1 illustrates a half part of a compressor housing 1 and a hermetic terminal 2 inserted in the housing wall. The compressor further comprises an upper half part (not shown) forming a sealed housing which contains a refrigerant which is communicated, e.g., between a condenser and an evaporator of a cooling or heating system via the pipe connections 3. By phase shifts between liquid and vapour phases, thermal exchange can provide efficient heating and cooling. The compressor houses a compression assembly, e.g., a piston compressor, and an electric motor, e.g., an AC motor, which drives the compression assembly. The housing and compression assembly is not illustrated, but could be any kind of well-known compression assembly and housing.

Figure 2:
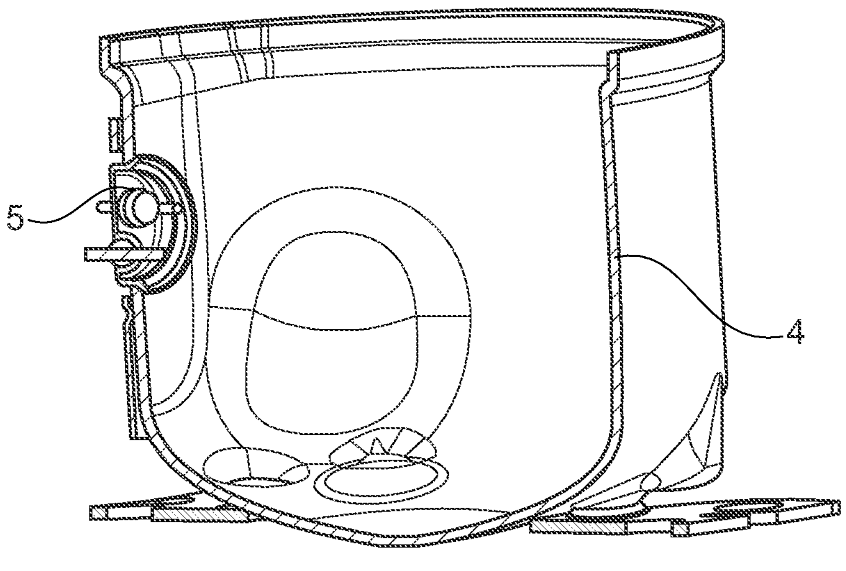
FIG. 2 illustrates a cross section of the housing wall and hermetic terminal.

FIG. 2 illustrates a cross section of the housing wall 4, including the hermetic terminal 2. The illustration shows that the terminal holder 5 is welded into the housing wall 4 and thereby forms part of the housing wall.

Figure 3:
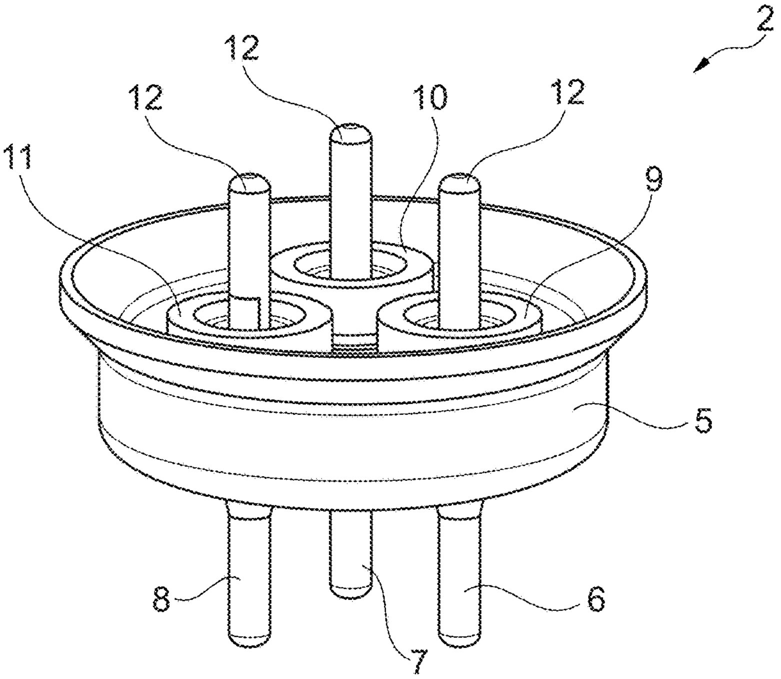
Fig. 3 (Related Art)
FIG. 3 illustrates a traditional hermetic terminal.

FIG. 3 illustrates a perspective view of a hermetic terminal including a terminal holder 5 made of steel and configured to be welded into the housing wall of the compressor. The hermetic terminal further comprises three pins 6, 7, 8, and three insulative sealing elements 9, 10, 11 forming an insulative structure. The terminal pins form tip ends 12 inside the compressor housing. These tip ends are configured for connection to the main and auxiliary windings of the electric motor.

Figure 4:
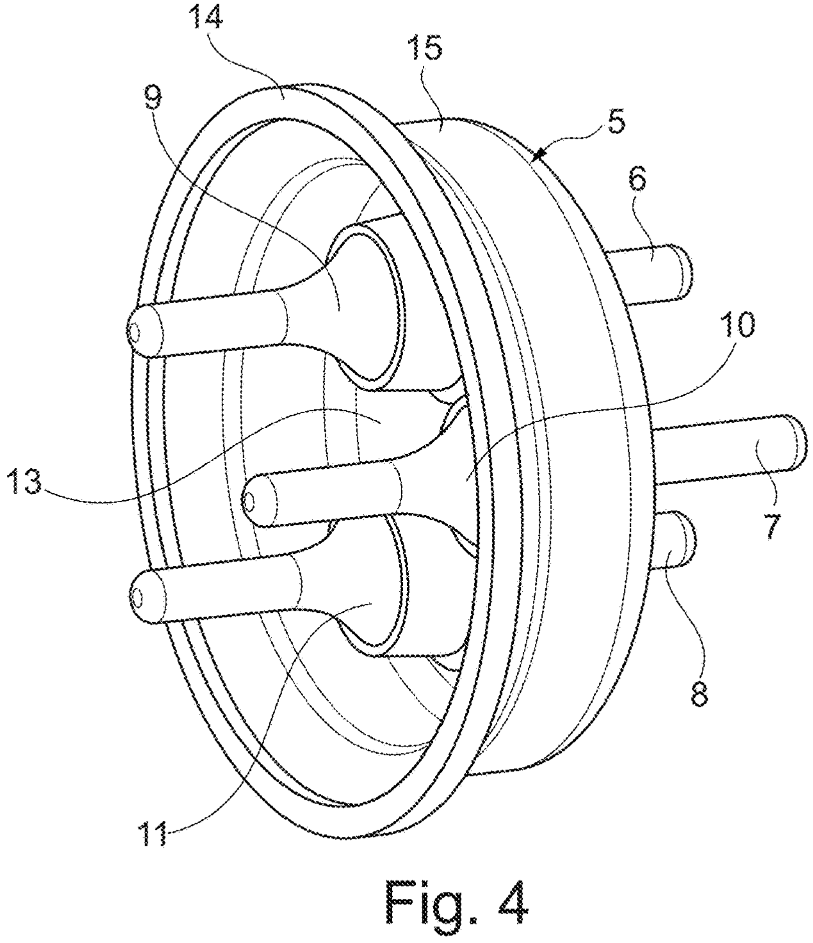
FIG. 4 illustrates the hermetic terminal with a floating element.

FIG. 4 illustrates the hermetic terminal in a view where the cavity defined by the terminal holder is more clearly seen. The inner surface 13 of the terminal holder 5 is electrically separated from the terminal pins 6, 7, 8 by the insulative sealing elements 9, 10, 11. The insulative sealing elements are typically made of glass or a similar nonconductive material. During use, liquids in the housing contaminate the inner surface 13 and, due to metal fragments from wear and tear, a leak current may be generated from the terminal pins to the terminal holder, and via the terminal holder, to the entire compressor housing.

The cavity formed by the terminal holder is terminated upwardly by the circumferential edge 14 of the sidewall 15. The sidewall is welded into the compressor housing and thereby forms one single unit with the compressor housing.

Figure 5:
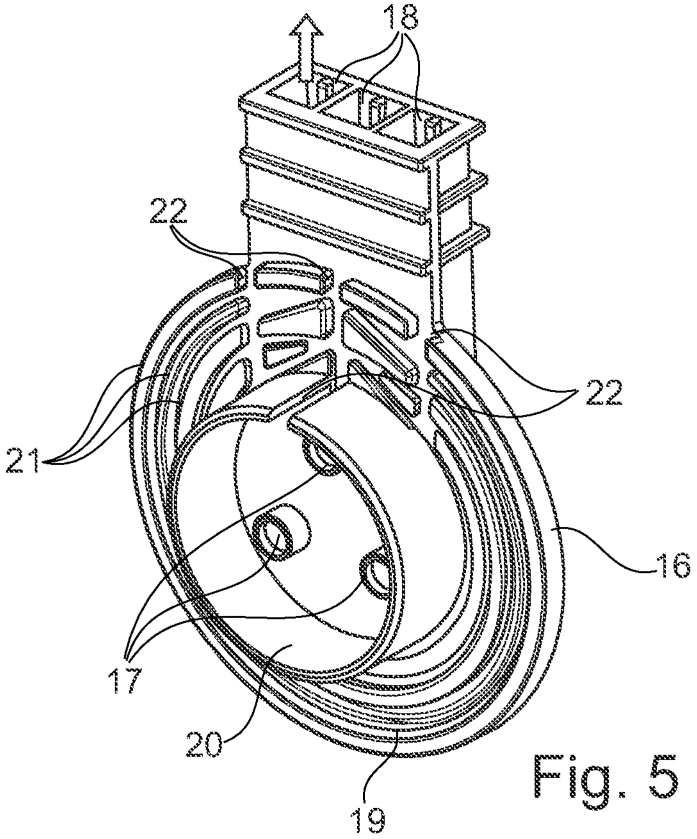
FIG. 5 illustrates a sealing element.

FIG. 5 illustrates a sealing element 16 that is shaped and sized to seal against the edge 14 to thereby define the enclosed space in the cavity. The enclosed space encloses the surface of the insulative structure, which is exposed in the cavity.

In addition to the sealing against ingress of liquids into the enclosed space, the sealing element has the feature of connecting the motor electrically. For that purpose, the sealing element comprises a plug structure 17, 18 forming one connection plug opening 17 for each terminal pin in the hermetic terminal. The plug structure is configured to electrically engage the terminal pins and connect them individually to the electric motor via cables (not shown). The cables, when mounted, extend through the openings 18, defining a cable direction indicated by the arrow.

Each of the plug openings 17 may include resilient spring means forming a firm grip against the surface of the terminal pins and the plug structure thereby further functions as a retaining means for retaining the position of the sealing element 16 against the edge 14 of the terminal holder 5. The resilient spring means is of a kind generally known, e.g., from sockets, e.g., from power sockets.

The sealing element 16 forms a base 19 and an annular wall 20 extending from the base and configured to enter into the cavity. The annular wall and the terminal holder have matching sizes and shapes such that the annular wall fits tightly into the cavity, e.g., such that the annular wall 20 is in contact with the sidewall 15. In this way, the annular wall supports the fixation of the sealing element onto the hermetic terminal and supports the function of preventing ingress of liquids into the cavity.

In the disclosed embodiment, the sealing element further comprises a plurality of annular ridges 21 extending upwards from the base. The ridges are lower than the annular wall 20 and extend in parallel with the annular wall, circumferentially around the annular wall. In the disclosed embodiment, both the ridges and the wall are circular. The annular ridges extend outside the cavity when the sealing element is attached to the terminal holder.

Both the annular wall and the annular ridges comprise indentations 22. These indentations provide a discontinuity of the wall and ridges and thereby define openings across the wall or and ridges.

Figure 6:
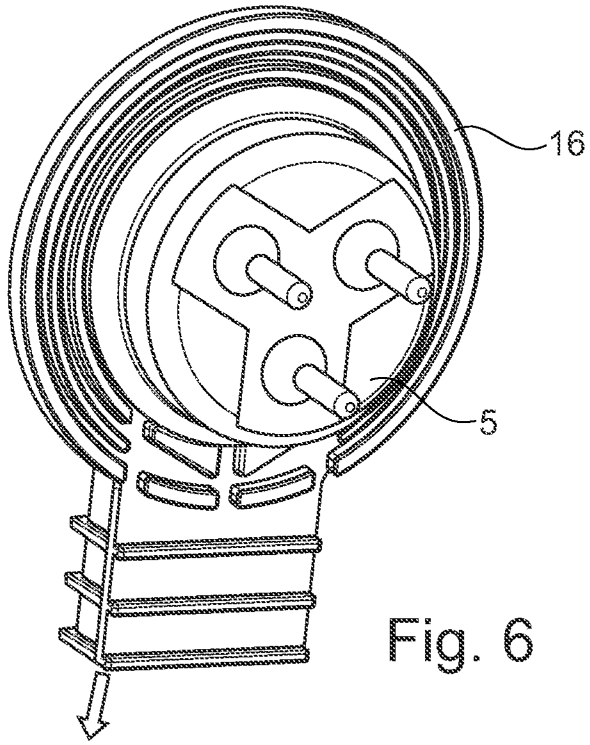
FIG. 6 illustrates the sealing element when attached to the hermetic terminal.

The electric compressor may define an operational orientation. This orientation is typically dictated by gravity acting on liquids in the housing and ensures that lubrication oil reaches the oil pump etc. FIG. 6 illustrates an orientation wherein the cable direction, illustrated by the arrow, is downwards relative to gravity when the electric compressor is in the operational orientation. The indentations are also located in a lower portion of the annular ridge or annular wall relative to gravity when the electric compressor is in the operational orientation, and liquids that may have entered the cavity can thereby drain downwards by gravity. The indentations are symmetrically placed relative to a vertical plane when the electric compressor is in the operational orientation.

In FIG. 6, the sealing element is attached to the hermetic terminal. In the illustrated embodiment, the base forms a surface that is perpendicular to the terminal pins.

In all illustrations, the hermetic terminal comprises three terminal pins. This corresponds to a zero pin and one phase for each winding of a motor with a main winding and an auxiliary winding. However, other numbers of terminal pins and other ways of connecting the terminal pins to the motor may be considered within this disclosure, e.g., two terminal pins for connecting phase and zero to a motor requiring only one phase connector, e.g., a motor having only one winding.

Figure 7:
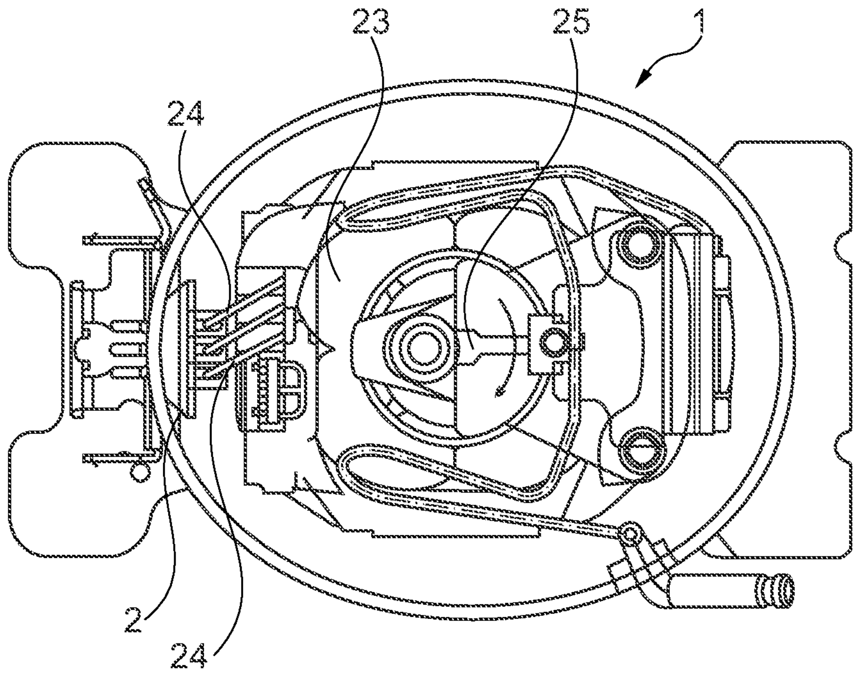
FIG. 7 illustrates a compressor housing seen from above, and illustrates the compression assembly and connections between the hermetic terminal and the electric motor schematically.

FIG. 7 illustrates a compressor housing seen from above, and illustrates schematically the compression assembly 23 and cables 24 connecting the terminal pins with the electric motor 25.

The invention claimed is:

1. An electric compressor comprising:

a compression assembly, an electric motor arranged to drive the compression assembly;

a compressor housing forming hermetic accommodation of the electric motor and the compression assembly; and a hermetic terminal comprising:

a terminal holder defining a cavity and forming part of the housing, wherein the cavity formed by the terminal holder being terminated by a circumferential edge of a sidewall welded into the compressor housing and thereby forming one single unit with the compressor housing, at least two electrically conductive terminal pins extending through the terminal holder and connected to the electric motor, and an insulative structure insulating the terminal pins from the terminal holder and having a surface exposed in the cavity, wherein the electric compressor further comprises a sealing element defining an enclosed space in the cavity, wherein the sealing element forms a base and an annular wall extending from the base and configured to extend into the cavity such that the annular wall is in contact with the sidewall, and wherein the sealing element comprises at least one annular ridge extending upwards from the base, the annular ridge extending about the annular wall outside the cavity.

2. The electric compressor according to claim 1, wherein the sealing element is electrically non-conductive.

3. The electric compressor according to claim 1, wherein the terminal holder defines an edge extending about the cavity and the sealing element is configured to seal against the edge to thereby define the enclosed space in the cavity.

4. The electric compressor according to claim 3, wherein the sealing element comprises a plug structure configured to electrically engage the terminal pins and connect them to the electric motor.

5. The electric compressor according to claim 4, wherein the plug structure is configured to maintain the sealing element against the edge by the engagement between the terminal pins and plug structure.

6. The electric compressor according to claim 4, wherein the plug structure defines a cable direction in which cables extend away from the hermetic terminal, the cable direction being downwards relative to gravity when the electric compressor is in an operational orientation.

7. The electric compressor according to claim 6, wherein the at least one annular ridge extends in parallel with the annular wall.

8. The electric compressor according to claim 1, wherein at least one of the annular wall or annular ridge comprises at least one indentation defining an opening across the annular wall or annular ridge.

9. The electric compressor according to claim 8, defining an operational orientation and wherein at least one indentation is located in a downwards portion of the annular ridge or annular wall relative to gravity when the electric compressor is in the operational orientation.

10. The electric compressor according to claim 8, comprising at least two indentations defining an opening across one of the annular wall or annular ridge.

11. The electric compressor according to claim 10, wherein the at least two indentations are symmetrical with respect to a vertical plane when the electric compressor is in an operational orientation.

12. The electric compressor according to claim 1, wherein the base forms a surface which is perpendicular to the terminal pins.

13. The electric compressor according to claim 1, comprising three terminal pins extending through the terminal holder and connecting to the electric motor.

14. The electric compressor according to claim 1, wherein the terminal pins extend through the terminal holder and contact the sealing element, the sealing element electrically isolating the terminal pins from each other.

15. The electric compressor according to claim 1, comprising a refrigerant in the housing, the refrigerant selected from the group consisting of R134a, R407C, R744 ($CO_2$), and R290.

16. The electric compressor according to claim 1, wherein the insulative structure comprises an insulative sealing element for each terminal pin, each insulative sealing element insulating a terminal pin from the terminal holder and having a surface exposed in the cavity.

17. A method of sealing a cavity of a hermetic terminal for an electric compressor, wherein the cavity is formed by a terminal holder being terminated by a circumferential edge of a sidewall welded into a compressor housing of the electric compressor and thereby forming one single unit with the compressor housing, the method comprising:

providing a sealing element configured to define an enclosed space in the cavity, the sealing element being provided with an integrated plug structure, and the plug structure is utilized for keeping the sealing element against an edge of the terminal holder to thereby define the enclosed space in the cavity, wherein the sealing element forms a base and an annular wall extending from the base and configured to extend into the cavity such that the annular wall is in contact with the sidewall, and wherein the sealing element comprises at least one annular ridge extending upwards from the base outside the cavity.

* * * * *